United States Patent
Neuhaeuser

(10) Patent No.: US 9,004,266 B2
(45) Date of Patent: Apr. 14, 2015

(54) MAGNETIC BELT CONVEYOR

(75) Inventor: Juergen Neuhaeuser, Luener (DE)

(73) Assignee: Neuhaeuser GmbH, Luenen (DE)

( * ) Notice: Subject to any disclaimer, the term of this patent is extended or adjusted under 35 U.S.C. 154(b) by 104 days.

(21) Appl. No.: 13/699,480

(22) PCT Filed: May 10, 2011

(86) PCT No.: PCT/EP2011/057556
§ 371 (c)(1),
(2), (4) Date: Feb. 3, 2013

(87) PCT Pub. No.: WO2011/147684
PCT Pub. Date: Dec. 1, 2011

(65) Prior Publication Data
US 2013/0126310 A1 May 23, 2013

(30) Foreign Application Priority Data
May 27, 2010 (DE) .................... 20 2010 007 281 U

(51) Int. Cl.
*B65G 47/00* (2006.01)
*B65G 15/32* (2006.01)
*B65G 21/20* (2006.01)

(52) U.S. Cl.
CPC ................ *B65G 47/00* (2013.01); *B65G 15/32* (2013.01); *B65G 21/2018* (2013.01); *B65G 2207/10* (2013.01)

(58) Field of Classification Search
CPC . B65G 21/2018; B65G 21/2009; B65G 15/32
USPC ..................................................... 198/690.1
See application file for complete search history.

(56) References Cited

U.S. PATENT DOCUMENTS

| | | | | |
|---|---|---|---|---|
| 5,316,132 A * | 5/1994 | Muraoka et al. | ............... | 198/847 |
| 5,540,983 A * | 7/1996 | Maris et al. | ..................... | 442/62 |
| 5,853,849 A * | 12/1998 | Nishio et al. | .................. | 428/143 |
| 5,857,556 A * | 1/1999 | Bonacorsi | ..................... | 198/683 |
| 6,046,300 A * | 4/2000 | Umetsu et al. | ................ | 528/176 |
| 6,102,191 A * | 8/2000 | Janzen et al. | ............. | 198/689.1 |
| 6,588,580 B2 | 7/2003 | Janzen | | |
| 6,823,986 B2 * | 11/2004 | Vogel | ......................... | 198/689.1 |
| 7,097,026 B2 * | 8/2006 | Lawrence | ................. | 198/690.1 |
| 7,354,876 B2 * | 4/2008 | Porter et al. | .................. | 442/172 |
| 7,428,963 B2 * | 9/2008 | LeGuyader | .................... | 198/846 |
| 7,850,562 B2 * | 12/2010 | DeGroot | ...................... | 474/153 |

(Continued)

FOREIGN PATENT DOCUMENTS

DE 19942882 A 6/2001
DE 10029470 A 1/2002

(Continued)

*Primary Examiner* — Gene Crawford
*Assistant Examiner* — Thomas Randazzo
(74) *Attorney, Agent, or Firm* — Andrew Wilford

(57) ABSTRACT

The invention relates to a magnetic conveying device for transporting in particular panel-shaped objects (1). The device comprises a plurality of magnetic retaining elements (3) arranged successively in the conveying direction and has at least one conveyor belt (4) running past the magnetic retaining elements (3). The conveyor belt (4) is equipped with a plurality of teeth (6) arranged on the upper face thereof facing away from the objects (1) for engaging in associated drive elements for driving the conveyor belt (4). According to the invention, at least the upper face of the conveyor belt (4) has an anti-static coating covering the entire surface area.

17 Claims, 2 Drawing Sheets

(56) References Cited

U.S. PATENT DOCUMENTS

| | | | |
|---|---|---|---|
| 7,909,719 B2 * | 3/2011 | Leighton et al. | 474/264 |
| 8,192,316 B2 * | 6/2012 | Marc | 474/266 |
| 2004/0096646 A1 | 5/2004 | Behrendt | |
| 2006/0213752 A1 | 9/2006 | Murakami | |
| 2008/0087527 A1 * | 4/2008 | Esser et al. | 198/844.1 |
| 2011/0232002 A1 * | 9/2011 | Wiessner | 5/706 |
| 2012/0053020 A1 * | 3/2012 | Wright | 482/54 |

FOREIGN PATENT DOCUMENTS

| | | | | |
|---|---|---|---|---|
| DE | 10230306 A | | 1/2004 | |
| DE | 102005001568 A | | 7/2006 | |
| DE | WO2009/092174 | * | 7/2009 | B65G 15/34 |
| EP | 0827920 A | | 3/1998 | |
| GB | 1581342 B | | 12/1980 | |
| WO | 2009092174 A | | 7/2009 | |
| WO | WO2009/092174 | * | 7/2009 | B65G 15/34 |

\* cited by examiner

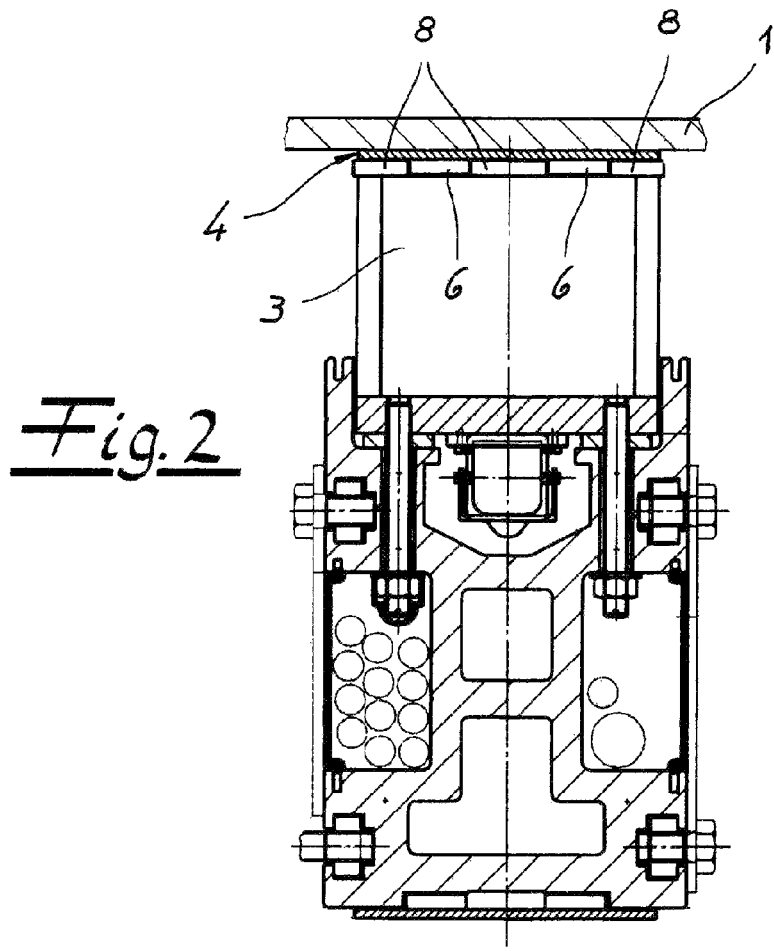
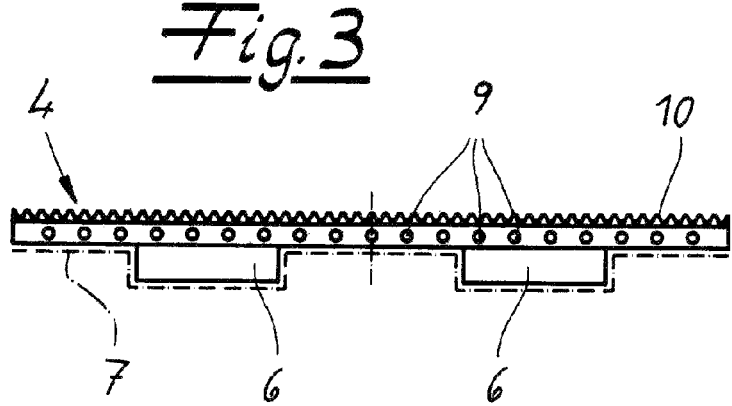

MAGNETIC BELT CONVEYOR

CROSS REFERENCE TO RELATED APPLICATIONS

This application is the US-national stage of PCT application PCT/EP2011/057556 filed 10 May 2011 and claiming the priority of German patent application 202010007281.6 itself filed 27 May 2010.

FIELD OF THE INVENTION

The invention relates to a magnetic conveyor for conveying, in particular, panel-shaped objects, comprising a plurality of magnetic retaining elements extending in a row in a travel direction, and comprising at least one conveyor belt extending past the magnetic retaining elements and provided with an array of teeth provided on the back face of the belt turned away from the objects, the teeth functioning to engage associated drive elements to drive the conveyor belt.

BACKGROUND OF THE INVENTION

Magnetic conveyors of this type are typically employed for the suspended or resting conveyance of panels. These can involve housing panels for, in particular, domestic appliances, stamped parts in the automotive industry, container lids, etc. Panel-shaped objects of this type are of ferromagnetic construction in order to allow them to held on the passing conveyor belt by magnetic retaining elements and dropped precisely. To this end, the operation employs switchable electromagnets as the magnetic retaining elements. In addition, however, permanent magnets can also be used.

Whenever nonferromagnetic materials such as, for example, glass sheets, wooden panels, etc., are to be conveyed by this type of magnetic conveyor, the device must generally and also be equipped with suction holders. Combined conveyors of this type are described, for example, in the generic prior art as set forth in EP 0 893 372 [U.S. Pat. No. 6,588,580].

Similarly, EP 0 827 920 is prior art of the generic kind. The same applies for WO 1997/038927 [U.S. Pat. No. 6,102,191]. Overall, the prior art has proven successful. Nevertheless, recently problems have increasingly arisen in practical use that can be attributed to a significant increase in travel speed. This is because in fact the conveyor belts used are typically produced from plastic, such as, for example, PUR (polyurethane). On the other hand, the magnetic retaining elements are of metallic construction, being made of steel, for example.

Due to the increasing travel speeds, electrostatic charges are currently observed that can be traced primarily to the friction between the conveyor belt and the magnetic retaining elements, or to the optional suction holders. This situation is not altered by the fact that such a conveyor belt described by EP 0 893 372 is partially covered with a polyamide coating on a contact surface with a guide body (see reference numeral 2' in FIG. 6). Although overall friction is in fact reduced this way, it continues to be impossible nevertheless to prevent "electrostatic charging" of the conveyor belt.

These electrostatic charges are especially detrimental for magnetic conveyors. They result in multiple problems. First, the electrostatic charging of the conveyor belt causes dust such as metal shavings, etc. to be attracted by the conveyor belt and contaminate the magnetic conveyor, conveyor belt, and/or the conveyed objects. An increase in wear to the magnetic conveyor is also observed. A more serious aspect, however, is the fact that the electrostatic charges discharge uncontrollably and thereby create sparks that easily disrupt the proper functioning of the magnetic retaining elements. This means that the functioning of, in particular, switchable electromagnets acting as magnetic retaining elements is disrupted. As a result, proper drop-off of the objects to be conveyed, for example, is no longer assured. The purpose of the invention is to remedy this situation.

OBJECT OF THE INVENTION

The object of the invention is to further develop a magnetic conveyor of this type in such a way that wear is reduced and the generation of sparks no longer occurs due to electrostatic charge buildup.

SUMMARY OF THE INVENTION

To achieve this object, the invention proposes an approach for a magnetic conveyor of the generic kind whereby at least a face of the conveyor belt has a coating that covers the entire surface and is antistatic.

According to the invention, it is thus primarily the back face of the conveyor belt—that is, the side turned away from the objects and facing the magnetic retaining elements including the teeth located there—that is covered with the relevant antistatic coating. This occurs over the entire surface. In other words, the teeth provided on the face for engaging the drive elements as well as the adjacent surfaces are completely covered with the relevant antistatic coating. The antistatic coating thus covers the relevant face of the conveyor belt including the teeth continuously, that is, over the entire surface. Of course it is also possible in principle to also furnish the front face of the conveyor belt facing the objects to be conveyed with this type of full-coverage and antistatic coating. Generally, however, this is not necessary since the objects do not move relative to the conveyor belt, and thus there is no friction. The situation is different between the back face of the conveyor belt and the magnetic retaining elements since the magnetic retaining elements are generally stationary while the conveyor belt is moved along them, generating friction.

The coating enables multiple positive effects to be achieved. First, the antistatic coating of the back face of the is conveyor belt ensures that any electrostatic charges generated by the friction of the conveyor belt are immediately dissipated. This is ensured by the antistatic coating that is provided with a specific predetermined electrical conductivity, or has an electrical surface resistance that typically is in the range below 100 kΩ.

In fact, electrical surface resistances are usually found that are below 50 kΩ. In this way, electrostatic charges are effectively dissipated—specifically, through the (metal-type) magnetic retaining elements or a machine frame carrying the magnetic retaining elements.

In addition, the antistatic treatment by the full-coverage coating is enhanced by the fact that the frictional resistance is reduced between the conveyor belt and the magnetic retaining elements. To this end, guide strips are provided that are attached to the magnetic retaining elements. Each conveyor belt rests by its face and the teeth on these guide strips. In this regard, the invention has succeeded in designing the coating of the relevant guide strips as well as those of the conveyor belt so as to reduce friction.

In overall terms, the guide strips on the magnetic retaining elements on one side and the full-coverage coating of the face of the conveyor belt on the other side are designed so as to create a frictional pairing having a coefficient of friction of less than 0.2. This is true in any case for sliding friction. In particular, friction coefficients are observed that are less than 0.1. Frictional properties are thus achieved that are similar to the dry sliding friction of steel on steel, which corresponds to friction coefficients ranging from 0.05 up to 0.2.

It has been furthermore been found advantageous in this regard if the guide strips (made of steel or metal) are provided with a special coating. This coating can be either a metal coating and/or a plastic coating. In the first case, the invention recommends a chromium coating. Alternatively or additionally, a coating that includes a plastic, in particular, PTFE (polytetrafluoroethylene) is also especially advantageous. When using PTFE-coated guide strips and a conveyor belt that has been covered with a friction-reducing coating, coefficients of friction have been observed for the frictional pairing of even less than 0.05, which fall in the range of sliding friction for the material pairing of steel against PTFE. More specifically, in order to achieve this the coating of the conveyor belt on the face is typically designed as a fabric coating. A synthetic fabric coating is generally used here.

Electrically conductive fibers have proven to be especially advantageous here. These can be based, for example, on polyamide or similar thermoplastic materials. In fact, semicrystalline thermoplastics, in particular, such as the polyamide already referenced, have proven especially advantageous.

This relevant thermoplastic material is designed to be especially resistant to abrasion and wear. In addition, these thermoplastics typically have water absorption of approximately 1 wt% up to 3 wt% (at 23° C. air temperature with a humidity of 50 wt%). This explains the special pliability and flexibility of these thermoplastics or of the especially preferred polyamide. The low electrical resistance is also enhanced this way.

Another enhancing factor here is that the relevant thermoplastic for producing the synthetic fabric coating contains 15 wt% up to 50 wt% of electrically conductive carbon. The relevant conductive carbon typically is carbon black. This electrically conductive carbon black can be dispersed into the polymer to be processed. It has been found in this regard that polyamides with their polar groups are highly compatible with the electrically conductive carbon black or carbon. The polyamides retain their high flowability even when a large quantity of electrically conductive carbon black is incorporated during the dispersion process—that is, the above-referenced 15 wt% up to 50 wt% of carbon black in the relevant thermoplastic (polyamide). This enables fibers or threads to be produced that in overall terms are electrically conductive, flexible, and at the same time have high strength, and that can be processed to create the desired polyamide fabric. At the same time, overall superior mechanical properties are observed since there is good adhesion between the polyamide and the electrically conductive carbon black.

In order for the relevant fabric to simultaneously provide a wear-resistant and flexible coating for the conveyor belt, an approach has proven successful whereby the fabric is provided overall with more than 5 warp filaments/cm and 5 weft filaments/cm. As a rule, even significantly more than 10 warp threads and weft filaments/cm are employed, usually even more than 20 filaments/cm. This enables a virtually continuous closed surface of the conveyor belt to be created on the back face turned toward the magnetic retaining elements, along which side the guide strips slide.

What is observed as the result of these measures is an overall low friction with coefficients of friction less than 0.2, in particular, less than 0.1, and very especially preferred even less than 0.05, between the relevant guide strips and the back face of the conveyor belt. In combination with the electrical surface resistance achieved by the fabric that is applied and has an antistatic effect, which resistance is significantly less than 100 kΩ, an overall buildup of electrostatic charges is precluded right from the start. As a result, no effects associated with this buildup of electrostatic charges occur (any longer).

An additional aspect is that the magnetic conveyor according to the invention is characterized by operating with especially low energy consumption, and thus operates in an especially energy-efficient manner. This is another positive secondary effect of the low friction between the guide strips and the face of the conveyor belt or the conveyor belt. As a result, the driving power can be reduced, and investment and operating costs can be lowered.

An additional positive effect to be mentioned is the fact that the generation of noise is significantly reduced as compared with previous magnetic conveyors, in fact the noise level is halved. This can attributed primarily to the fact that the teeth carry the inventive and friction-reducing coating on the back face of the conveyor belt. This enables the engagement and disengagement of the teeth to be optimized with of the respective openings of the drive element or the drive wheels on the machine frame. This is because hard edges or corners no longer strike each other during ingress or egress, whereas now the overall continuous fabric coating of the teeth ensures a smooth and fluid transition. As a result, noise generated in the region of the relevant drive wheels, in particular, is significantly reduced. This, of course, is also true for the overall operation of the magnetic conveyor according to the invention.

Another distinguishing characteristic to be noted is that the conveyor belt—even given large overall lengths—eliminates and can eliminate the need for additional guide strips such as, for example, those that are described in FIG. 2, reference numeral 43, of EP 0 827 920 and that have heretofore been considered indispensable in practice. Contributing to this is the supplementary measure whereby the conveyor belt has steel cables or steel strands extending in the travel direction that are embedded in the conveyor belt. The relevant steel strands are magnetically attracted by a plurality of magnetic retaining elements that are extending in a row in the travel direction and ensure that the conveyor belt lies properly against the magnetic retaining elements or the guide strips and does not sag. Thus no additional retaining strips are required. This also enables the friction to be further reduced, and at the same time also improves the noise level.

In the final analysis, utilization of a toothed belt as the conveyor belt has proven especially advantageous. This generally involves providing two rows of teeth extending in the travel direction. The rows of teeth are spaced apart, and furthermore are each at a given distance from the edge of the conveyor belt. As a result, a total of three guide strips are able to engage the three insets extending in the travel direction on the conveyor belt. This approach provides flawlessly guided transport of the conveyor belt even for large overall lengths. These must be considered the essential advantages.

BRIEF DESCRIPTION OF THE DRAWING

The following describes the invention in more detail based on a drawing that shows only one embodiment. Here:

FIG. 2 is a detail from FIG. 1; and

FIG. 3 is a detail from FIG. 2 in the region of the conveyor belt.

SPECIFIC DESCRIPTION OF THE INVENTION

Figure 1:
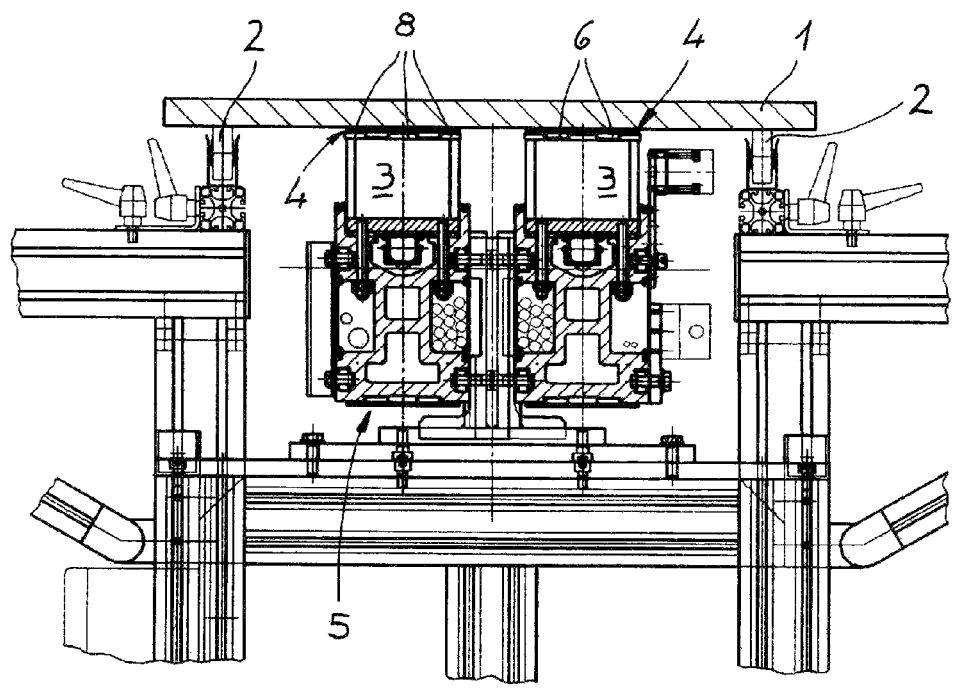
FIG. 1 is a schematic cross-section of a magnetic conveyor.

FIG. 1 shows a magnetic conveyor that is used in this embodiment for the resting conveyance of panel-shaped objects 1. In fact, the object 1 to be conveyed here is a steel panel 1 that is conveyed perpendicular to the drawing plane in FIG. 1 by the magnetic conveyor, which will be described in more detail below. The steel panel or panel-shaped object 1 here is supported at the edge by support rollers 2, here shown only by way of example and is not an absolute requirement.

The relevant magnetic conveyor has a plurality of magnetic retaining elements 3 extending in a row in the travel direction. FIG. 2 is a detail of a typical magnetic retaining element 3. This is a switchable electromagnet whose magnetic field can be switched on and off. This enables the panel-shaped object 1 to be lifted precisely from a respective conveyor belt 4. This is true at least for the illustrated resting conveyance. If the panel-shaped objects 1 are conveyed while suspended by equally possible overhead conveyor, the magnetic retaining element 3 is ensures they are dropped precisely. This is not however illustrated.

The above-referenced conveyor belt 4 moves past the magnetic retaining element or elements 3 that are aligned in a row in the travel direction. In the embodiment in fact, two rows of magnetic retaining elements 3 are provided, each row with a respective conveyor belt 4 with the elements spaced apart in rows parallel to the travel direction. The magnetic retaining elements 3 and respective conveyor belt 4 are mounted and secured by a machine frame 5 that is indicated only schematically. This frame 5 can be designed in such a way that the magnetic retaining elements 3 and respective conveyor belt 4 can be modified in terms of their position relative to objects 1 to be conveyed.

The conveyor belt 4 is provided with teeth 6 on its lower face turned away from the objects to be conveyed. The teeth 6 engage respective drive elements that are not illustrated. The drive elements are gears or drive sprockets that are provided circumferentially with recesses to receive the teeth 6. Consequently, each conveyor belt 4 is designed as a toothed belt and the drive wheels are sprockets. These function to drive the conveyor belt 4 in the travel direction.

Since the panel-shaped objects 1 are of ferromagnetic design, they are attracted by the magnetic retaining elements 3 that are stationary and aligned in a row extending in the travel direction. Each conveyor belt 4 functions to convey the objects 1 and is moved in the travel direction by drive wheels supported in the machine frame 5. This essential principle is well-known, reference being made by way of example to the prior art of EP 0 827 920.

According to the invention, The conveyor belt 4 is specially treated. Each conveyor belt 4 in fact has a full-coverage and antistatic coating 7 at least on its back face. This is best seen in the enlarged view of FIG. 3. The full-coverage coating 7 covers the entire back face of the conveyor belt 4 including the teeth 6 relative to the retaining elements 3.

The antistatic design of the coating 7 according to the invention is a special synthetic fabric. In fact, a fabric coating —in particular, synthetic fabric coating—is used that utilizes a thermoplastic material as the fiber material. This is a special synthetic material, that is a semicrystalline polymer, in general terms, and a polyamide, in particular.

The thermoplastic material for producing the fibers of the fabric coating typically has a water absorption of approximately 1 wt% up to 3 wt% (measured at a temperature of 23° C. and 50% relative humidity). In addition, carbon black is embedded in the relevant thermoplastic or polyamide (PA), and specifically in the amount of 15 wt% up to 50 wt%. As a result, the overall so-called sheet or surface resistance of the coating 7 produced in this way can be reduced to values below 100 k$\Omega$. This surface resistance is measured between the longitudinal edges of this conveyor belt 4.

In addition, a fabric is used to create the coating 7 or the fabric coating that is provided with more than 5 warp filaments/cm and more than 5 weft filaments/cm. Typically, even greater than 10 filaments/cm, and, in particular, even greater than 20 filaments/cm are used for each direction of the fabric. As a result, the coating 7 forms a virtually continuous closed surface on the face of the conveyor belt 4 that is of flexible design and at the same time has extremely high resistance to abrasion. This in combination with the fact that conveyor belt 4 rests on guide strips 8 enables especially advantageous frictional properties to be achieved. The guide strips 8 are attached magnetically to the magnetic retaining elements 3.

In fact, these guide strips 8 engage the back face of the conveyor belt 4 so that they laterally guide the conveyor belt 4. This is because the conveyor belt 4 according to the invention has two transversely spaced rows of the teeth 6 in the travel direction. A total of three guide strips 8 form two gaps receiving these two rows of teeth and extend to the edge of conveyor belt 4. This provides flawless lateral guidance, and also good guidance in the longitudinal or travel direction of the conveyor belt 4.

At the same time, advantageous frictional properties are observed since the guide strips 8 are provided with a friction-reducing coating. In fact, the guide strips 8 can have a metal coating and/or one composed of a synthetic material. In the first-referenced case, a chromium plating has been found advantageous. The second variant is characterized by a PTFE (polytetrafluoroethylene) coating. Quite apart from this, the coating 7 is designed to be friction-reducing, which aspect can be attributed to the special selection of the synthetic material used for the fabric and the fine-mesh fabric per se.

In both cases, a frictional pairing is provided between the conveyor belt 4 or the face of coating 7 and the guide strips 8 that has a coefficient of sliding friction of less than 0.2, and, in particular, less than 0.1. In an especially preferred approach, it is even possible to achieve coefficients of friction of less than 0.05. This successfully achieves an especially low-friction transport of the conveyor belt 4, and, as a result, it is possible for the drive wheels to operate with a low driving power. Operation is furthermore especially energy-efficient.

An additional aspect is that an extremely low generation of noise is found that can be attributed in particular to the fact that the teeth 6 are finished with the surface coating 7 that effects an especially smooth and low-noise ingress into the recesses of the drive wheels. Measures provided along the same lines achieve the result that the invention can explicitly eliminate the need for additional retaining strips for the conveyor belt 4, even in the case of long conveyor lengths.

For this purpose, in fact, a plurality of steel cables or steel strands 9 are embedded in the conveyor belt 4 or in its belt body. These steel cables 9 extending in the longitudinal travel direction of conveyor belt 4 are attracted by the magnetic retaining elements 3 and ensure that conveyor belt 4 is positioned without sagging on the guide strips 8. A supplemental corrugation 10 on the bottom side of the conveyor belt 4 or of the front face turned toward the objects 1 ensures that any contamination, oil, etc. on objects 1 will be forced into depressions between the corrugations 10, thereby providing flawless conveyance despite these factors.

The conveyor belt 4 is generally produced by extruding an appropriate synthetic material. As a rule, polyurethane (PUR) is employed as the base material for the conveyor belt 4. This can be designed with a different Shore hardness for the basic body on the one side, and for the corrugations 10 on the other side. The corrugations 10 are typically designed to be harder than the basic body.

During production, the steel cables 9 embedded in the basic body are made to simultaneously enter, as is the synthetic fabric as well, into the extruder in parallel with the plastic granulate. In other words, the synthetic fabric is introduced into the extruder and contacts at the outlet side the face of the conveyor belt 4 that is produced in this way. Optionally, the process can employ supplemental adhesion agents to promote the adhesion of the coating 7 to the face of the conveyor belt 4. This is generally not required, however.

In principle, the antistatic treatment of toothed belts with fabrics is also well-known, as is documented by DE 1 00 29 470, or also by DE 1 02 30 306. Nevertheless, corresponding belts or toothed belts have previously not been used with magnetic conveyors, and have very definitely not been used in combination with special guide strips for the purpose of achieving the desired coefficients of friction.

In addition, startup of the conveyor belt 4 according to the invention can be easily effected due to the low friction since the breakaway torque that is frequently observed in this regard is practically nonexistent. As a result, driving the individual drive wheels for the conveyor belt 4 can be done using an overall reduced power. This means that the static friction between the conveyor belt 4 and the guide strips 8 is not significantly increased relative to sliding friction. These must be considered the essential advantages.

The invention claimed is:

1. A magnetic conveyor for conveying panel-shaped objects, the conveyor comprising:
   a plurality of magnetic retaining elements extending in a row in the travel direction;
   guide strips extending in the direction, spaced transversely of the direction, having a chromium or plastic low-friction coating, and carried on the magnetic retaining elements;
   at least one conveyor belt extending past by the magnetic retaining elements, sliding on the low-friction coating of the guide strips, and provided with an array of teeth provided on a back face turned away from the objects, the teeth functioning to engage respective drive elements to drive the conveyor belt; and
   a full-coverage antistatic coating having an electrical surface resistance of less than 100 kΩ on at least the back face and teeth of the conveyor belt turned away from the objects being conveyed and toward the magnetic retaining elements and guide strips.

2. The magnetic conveyor according to claim 1, wherein the antistatic coating is not only antistatic but also friction-reducing.

3. The magnetic conveyor according to claim 1, wherein the guide strips and the low-friction coating form a frictional pairing with a coefficient of friction of less than 0.2.

4. The magnetic conveyor according to claim 1, wherein the the low-friction coating is a PTFE coating.

5. The magnetic conveyor according to claim 1, wherein the antistatic coating of the conveyor belt is a synthetic fabric coating.

6. The magnetic conveyor according to claim 5, wherein the synthetic fabric coating is applied by a synthetic fabric that is fed into an extruder for producing the conveyor belt around the synthetic fabric.

7. The magnetic conveyor according to claim 5, wherein the synthetic fabric is made of a semicrystalline thermoplastic polymer.

8. The magnetic conveyor according to claim 5, wherein a thermoplastic material for producing the antistatic coating has a water absorption of approximately 1 wt% up to 3 wt%.

9. The magnetic conveyor according to claim 5, wherein the synthetic fabric coating is made of thermoplastic material containing an electrically conductive carbon in an amount of approximately 15 wt% up to 50 wt%.

10. The magnetic conveyor according to claim 5, wherein the synthetic fabric coating is provided with more than 5 warp filaments/cm and 5 weft filaments/cm.

11. The magnetic conveyor according to claim 1, wherein the conveyor belt includes steel cables or steel strands extending in the travel direction.

12. The magnetic conveyor according to claim 1, wherein the conveyor belt is produced from a thermoplastic material.

13. The magnetic conveyor according to claim 1, wherein the magnetic retaining elements are permanent magnets or switchable electromagnets.

14. The magnetic conveyor defined in claim 1, wherein the low-friction coating of the guide strips and the anti-static coating of the belt form a frictional pairing with a coefficient of friction of less than 0.1.

15. The magnetic conveyor defined in claim 7, wherein the polymer is a polyamide.

16. The magnetic conveyor defined in claim 1, wherein the conveyor belt is of polyurethane.

17. The magnetic conveyor defined in claim 1, wherein the teeth extend in transversely spaced rows on the back face of the conveyor belt and the guide strips engage the back face of the conveyor belt only between the rows of teeth such that the belt cannot move significantly transversely of the direction relative to the guide strips.

* * * * *